(12) United States Patent
Klieman et al.

(10) Patent No.: US 8,392,208 B1
(45) Date of Patent: Mar. 5, 2013

(54) METHOD AND SYSTEM FOR HEALTH EXPENSE VERIFICATION AND PROCESSING

(75) Inventors: Michael S. Klieman, Belmont, CA (US); Muhammet Serdar Akin, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 946 days.

(21) Appl. No.: 11/668,161

(22) Filed: Jan. 29, 2007

(51) Int. Cl.
*G06Q 10/00* (2012.01)
*G06Q 50/00* (2012.01)
(52) U.S. Cl. .......................................... 705/2
(58) Field of Classification Search ................... 705/2, 3
See application file for complete search history.

(56) References Cited

U.S. PATENT DOCUMENTS

| | | | | |
|---|---|---|---|---|
| 6,343,271 | B1 * | 1/2002 | Peterson et al. | 705/4 |
| 6,826,536 | B1 * | 11/2004 | Forman | 705/4 |
| 7,213,750 | B1 * | 5/2007 | Barnes et al. | 235/381 |
| 2001/0037214 | A1 * | 11/2001 | Raskin et al. | 705/2 |
| 2002/0029157 | A1 * | 3/2002 | Marchosky | 705/3 |
| 2002/0147678 | A1 * | 10/2002 | Drunsic | 705/39 |
| 2003/0191669 | A1 * | 10/2003 | Fitzgerald et al. | 705/2 |
| 2004/0199406 | A1 * | 10/2004 | Owens et al. | 705/2 |
| 2005/0108067 | A1 * | 5/2005 | Chapman et al. | 705/4 |
| 2005/0278550 | A1 * | 12/2005 | Mahone et al. | 713/189 |
| 2005/0288964 | A1 * | 12/2005 | Lutzen et al. | 705/2 |
| 2006/0149595 | A1 * | 7/2006 | Williams et al. | 705/2 |

\* cited by examiner

*Primary Examiner* — Gerald J. O'Connor
*Assistant Examiner* — Trang Nguyen
(74) *Attorney, Agent, or Firm* — McKay and Hodgson, LLP; Philip McKay; Sean P. Lewis (57) ABSTRACT

A method and system for health care expense verification and reimbursement processing includes a process for health care expense verification and reimbursement processing whereby electronic data including data representing health care expense transactions is collected. The electronic data is then analyzed and health care expense transactions that are potentially eligible for reimbursement from a health care expense account are identified. The identified health care expense transactions are then verified as eligible health care expense transactions based on the electronic data collected and/or the source of the data. Data representing the verified health care expense transactions is then electronically and automatically made available to a health care expense account program administrator for immediate reimbursement processing.

24 Claims, 4 Drawing Sheets

METHOD AND SYSTEM FOR HEALTH EXPENSE VERIFICATION AND PROCESSING

BACKGROUND

Currently, many employers offer health care expense account programs in addition to traditional health care insurance. Herein, health care expense account programs are defined as programs which provide an employee and/or employee dependents a designated health care expense account that is assigned to the employee and is used to reimburse the employee for defined eligible health care expenses incurred by the employee and/or the employee's dependents. Examples of currently available health care expense account programs include, but are not limited to: flexible spending accounts (FSAs); health care reimbursement arrangements (HRAs); and health care spending accounts (HSAs).

In many cases, the health care expense account is a virtual account maintained by a health care expense program administrator or management service, also called a program administrator, either under the direct control of the employer or as a third-party agent of the employer. In other cases, the health care expense account is set up by the employees themselves. Typically, health care expense accounts are funded by either by the employee and/or the employer.

Health care expense account programs typically help the employee pay health care expenses that are not covered by the employees health care insurance such as: deductibles; the employee's portion of health care expenses; co-payments for doctors visits and prescriptions; co-payments for medical supplies and devices; extended care and/or home care; and various other health care expenses determined to be eligible by the employer and/or health care expense program administrator and/or the IRS.

In typical operation, funds are deposited in the health care expense account by the employee, the employer, or a combination of both. Once the health care expense account is funded, the funds are made available to reimburse the employee for out of pocket expenses incurred by the employee in eligible health care expense transactions. In most cases, the employee first pays the health care expense using his or her own funds. Then the employee makes a request to the program administrator for reimbursement of the funds. The employee should then eventually be reimbursed for his or her out of pocket expenses from the health care expense account. In other cases, as discussed below, the employee use specially dedicated debit/credit cards that are directly linked to the health care expense account and/or track health care expense transactions. In other cases, the health care expense is paid with specially dedicated debit/credit cards that are directly linked to the health care expense account and then the health care expense must be substantiated using a receipt, bill or explanation of benefits document.

The process above sounds simple enough. However, in reality, the process of making a request to the program administrator for reimbursement of funds typically requires the employee to gather and store documentation, i.e., receipts, invoices, explanation of benefits (EOBs), and/or numerous other documents from various sources, showing, not only that the employee paid the health care expense, but also showing that the health care expense itself was an eligible health care expense. Then, the employee must typically fill out one or more reimbursement request forms to formally request reimbursement. The reimbursement request form(s) must then be submitted by the employee to the program administrator, along with copies of the supporting documentation. For many employees this is a daunting and burdensome task. This is especially true since, in many cases, individual eligible health care expenses are often only a few dollars, such as a $10.00 co-pay for a doctor visit or prescription. However, in many cases, large numbers of individual eligible health care expenses are incurred by the employee and/or the employee's dependents over the course of a year. Consequently, many employees are required to obtain, save, copy, fill out, and submit a burdensome number of documents in order to receive reimbursement for relatively small sums of money. As a result, many employees feel the paperwork burden exceeds the value of the program and the intended employment "benefit" comes to be viewed by the employee as an employment "burden". This fact serves neither the employee nor the employer's best interests.

In addition, once the employee performs his or her part of the process, the program administrator must now review the reimbursement requests and sort through the copies of the supporting documentation to first identify that a given health care expense was paid by the employee and then verify that the health care expense was an eligible health care expense. This information and documentation, often in the form of paper copies, must then be entered into the program administrator's system, which typically involves redundant data entry and/or processing time.

In most cases, once a given health care expense is identified, authenticated, and verified as an eligible health care expense by the program administrator, and it is determined that the employee has a sufficient balance in the health care expense account to cover the eligible health care expense, then, and only then, is the employee is reimbursed for his or her out of pocket costs associated with the health care expense transaction.

The process described above is not only burdensome and costly to both the employee and program administrator, but is also presents multiple opportunities for the introduction of human error and the introduction of bureaucratic mistakes and inefficiencies. Consequently, neither the employee, the employer, nor the program administrators are well served by the process described above.

As mentioned above, in an effort to mitigate some of the problems described above, some health care expense account programs currently provide dedicated debit/credit cards that are directly linked to the health care expense account and/or track health care expense transactions. In some instances, these dedicated debit/credit cards are used to verify health care expense transactions and, in some cases, directly access health care expense account funds. However, in order to obtain the full benefit of the dedicated debit/credit card, the health care expense must typically be incurred with specific seller/health care providers that have a pre-existing relationship with the health care expense account program administrator. Consequently, programs providing dedicated health care expense account debit/credit cards are, at best, inconvenient in that they require the employee to carry a separate dedicated debit/credit card and, in many cases, highly restrictive in that the debit/credit card is only helpful when used with specific sellers/health care providers.

In other cases, the health care expense is paid with specially dedicated debit/credit cards that is directly linked to the health care expense account and then the health care expense must still be substantiated using a receipt, bill or explanation of benefits document.

SUMMARY

In accordance with one embodiment, a method and system for health care expense verification and reimbursement processing includes a process for health care expense verification and reimbursement processing whereby electronic data including data representing health care expense transactions is collected. The electronic data is then analyzed and health care expense transactions that are potentially eligible for reimbursement from a health care expense account are identified. The identified health care expense transactions are then verified as eligible health care expense transactions based on the electronic data collected and/or the source of the electronic data. Data representing the verified health care expense transactions is then electronically, and in one embodiment, automatically, made available to a health care expense account program administrator for immediate reimbursement processing.

In one embodiment, the electronic data including data representing health care expense transactions is collected from electronically transferred Explanation of Benefits (EOB) data provided by health insurance providers.

In one embodiment, the electronic data including data representing health care expense transactions is collected from the employee/user by the employee/user scanning paper forms of verification such as bills, receipts, EOBs, etc. in to a computing system and then electronically transferring the data.

In one embodiment, the electronic data including data representing health care expense transactions is collected through electronically transferred invoices/patient bills provided by health care providers. In one embodiment, the electronic data including data representing health care expense transactions is collected from electronic transaction data maintained by banks and/or credit account providers. In one embodiment, the electronic data including data representing health care expense transactions is collected from electronic receipts provided by suppliers of medications and/or medical devices and/or supplies. In one embodiment, the electronic data including data representing health care expense transactions is collected from any combination of the above sources and/or from any other source of electronic data including data representing health care expense transactions, whether known at the time of filing or as developed thereafter.

In one embodiment, once the electronic data is collected, the data is then analyzed and eligible health care expense transactions are identified and verified. In one embodiment, electronically transferred EOB data provided by health insurance providers is analyzed to identify an employee's portion of payments made and/or any co-payments made by the employee. In one embodiment, the eligible health care expense transactions are then considered verified based on the source of the data. In one embodiment, electronically transferred invoices/patient bills provided by health care providers are analyzed to identify the amount billed directly to the employee by the health care providers. In one embodiment, the eligible health care expense transactions are then considered verified based on the source of the data.

In one embodiment electronic transaction data maintained by banks and/or credit account providers is obtained and analyzed to identify potential health care expense transactions based on an assigned category of transaction and/or the merchant paid through the transaction. In one embodiment, the electronic transaction data maintained by banks and/or credit account providers is analyzed to identify potential health care expense transactions and/or verify the eligible health care expense transactions based on "level-3" transaction data identifying specific items purchased, the provider of such items, the date of purchase, and the price paid by the employee. In one embodiment, the electronic receipts provided by suppliers of medications and/or medical devices/ supplies, such as drug stores, pharmacies, medical supply companies, etc., are obtained and analyzed to identify potential health care expense transactions. The health care expense transactions are then verified based on receipt data identifying specific items purchased, the date of purchase, the provider of such items, and the price paid by the employee.

In one embodiment, the electronic data including data representing health care expense transactions is analyzed and eligible health care expense transactions are identified and verified by any combination of the methods described above and/or any other method of scanning electronic data to identify and verify eligible health care expense transactions, whether known at the time of filing or as developed thereafter.

In one embodiment, eligible health care expense transactions are further verified by checking the subject matter and/ or purchase items associated with the health care expense transactions against a listing of eligible (or non-eligible) health care expenses. In one embodiment, the listing of eligible (or non-eligible) health care expenses is provided by the employer and/or program administrator and/or IRS.

In one embodiment, eligible health care expense transactions are also verified and/or authorized by the employee. In this embodiment, the employee is provided a listing of potentially eligible health care expense transactions. The employee is then provided an opportunity to edit the list and/or remove specific potentially eligible health care expense transactions from the listing prior to submission to the program administrator.

In one embodiment, once one or more eligible health care expense transactions are identified and verified, data representing the verified health care expense transactions is then electronically, and in one embodiment, automatically, made available to a health care expense account program administrator as verified and authenticated health care expenses eligible for immediate reimbursement processing.

As discussed in more detail below, using the below embodiments, with little or no modification and/or user input, there is considerable flexibility, adaptability, and opportunity for customization to meet the specific needs of various users under numerous circumstances.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for health care expense verification and reimbursement processing includes a process for health care expense verification and reimbursement processing whereby electronic data including data representing health care expense transactions is collected. The electronic data is then analyzed and health care expense transactions that are potentially eligible for reimbursement from a health care expense account are identified. The identified health care expense transactions are then verified as eligible health care expense transactions based on the electronic data collected and/or the source of the electronic data. Data representing the verified health care expense transactions is then electronically, and in one embodiment, automatically, made available to a health care expense account program administrator for immediate reimbursement processing.

Using the method and system for health care expense verification and reimbursement processing, and the process for health care expense verification and reimbursement processing, disclosed herein, eligible health care expense transaction data, and the supporting documentation data for those transactions, is electronically collected, identified, and verified with little or no consumer/employee action being required. The identified and verified health care expense transaction data is then made available to the program administrators in electronic form as identified and verified health care expenses eligible for reimbursement. As a result, the process of identifying, documenting and verifying eligible health care expenses is significantly less burdensome for both the employee and the program administrator. In addition, there are far fewer opportunities for human error and/or bureaucratic mistakes and inefficiencies.

Using the method and system for health care expense verification and reimbursement processing, and the process for health care expense verification and reimbursement processing, disclosed herein, no special and/or dedicated debit/credit cards are required and the employee is free to use any form of payment desired and the health care expense transactions can be conducted through any seller and/or health care provider of the employee's choice. Consequently, the method and system for health care expense verification and reimbursement processing, and the process for health care expense verification and reimbursement processing, disclosed herein, provides increased flexibility and imposes minimal operational limitations and burdens on the employee.

Using the method and system for health care expense verification and reimbursement processing, and the process for health care expense verification and reimbursement processing, disclosed herein: the employee receives the full benefit of the health care expense account program, without the burdensome paperwork; the program administrators are provided pre-verified data that can be directly used to process reimbursements, thereby cutting the program administrator's workload, and the employer's cost of administrating the program; and, by providing a program having greater value to the employees, the employer gets the full intended benefit of providing the health care expense account program at the reduced cost.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments are implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. Computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or other electronic medium in which data may be exchanged between one computing system and one or more other computing system(s), whether known at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

Figure 1:
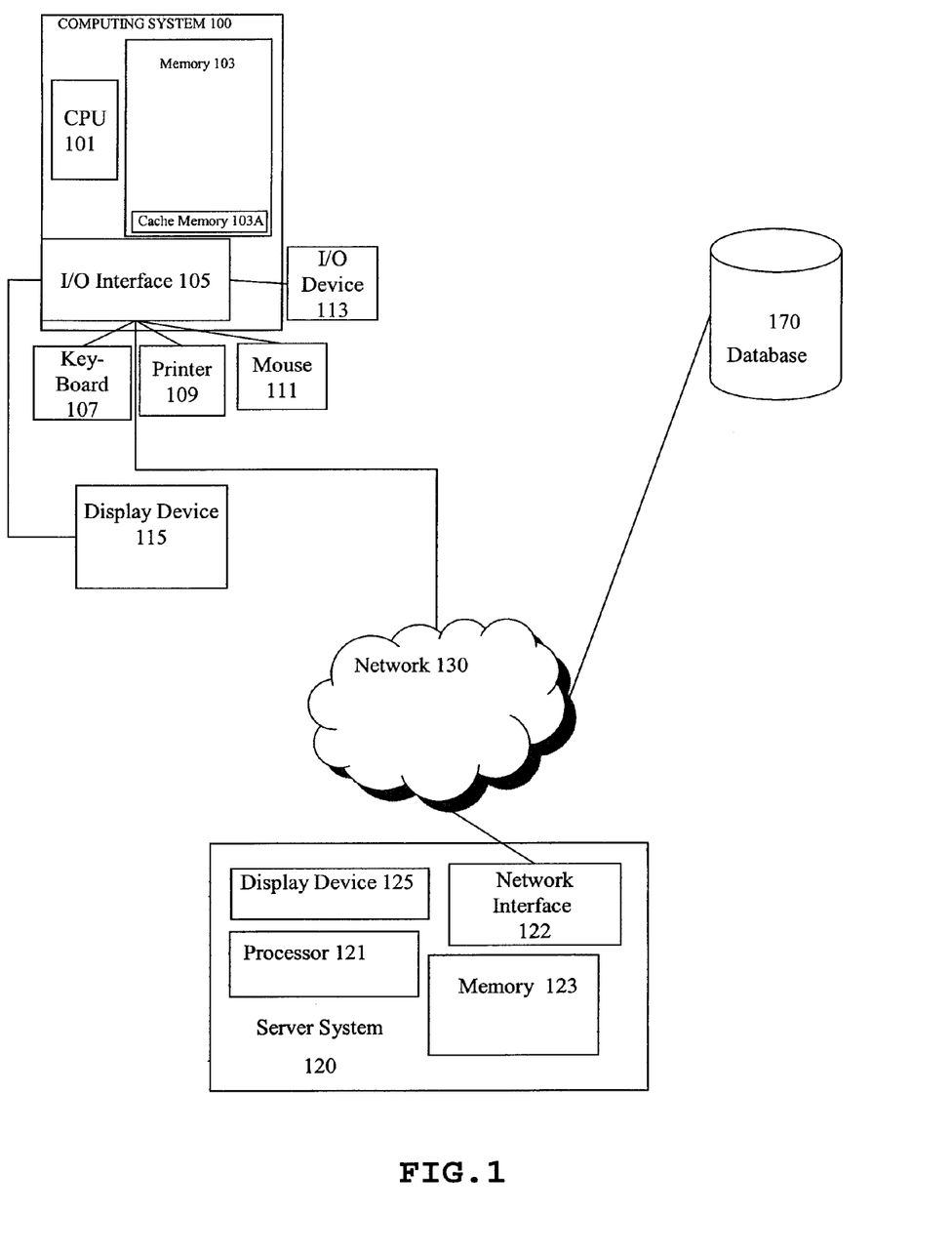
FIG. 1 is a block diagram of an exemplary hardware architecture for implementing one embodiment.

FIG. 1 is a block diagram of exemplary hardware architecture for implementing one embodiment of a process for health care expense verification and reimbursement processing, such as processes for health care expense verification and reimbursement processing 200, 300 and 400, discussed below, that includes: a computing system 100; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes all or part of a process for health care expense verification and reimbursement processing.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether known at the time of filing or as later developed. As discussed in more detail below, in one embodiment, a process for health care expense verification and reimbursement processing can be loaded, in whole, or in part, into computing system 100 via I/O device 113, such as from a CD, DVD or floppy disk containing all, or part, of a process for health care expense verification and reimbursement processing.

Also shown in FIG. 1 is database 170. In one embodiment, database 170 is a designated server system or computing system, or a designated potion of a server system or computing system, such as computing systems 100 and 120. In one embodiment, database 170 is a dedicated mass storage device implemented in software, hardware, or a combination of hardware and software. In one embodiment, database 170 is a web-based function. As discussed in more detail below, in one embodiment, a process for health care expense verification and reimbursement processing is stored in whole, or in part, in database 170.

In one embodiment, computing system 100 and database 170, are coupled to a server system 120 by network 130. Server system 120 typically includes a server system display device 125, a server system processor 121, a server system memory 123, and a server system network interface 122. As discussed in more detail below, in one embodiment, a process for health care expense verification and reimbursement processing is stored in whole, or in part, in server system 120.

Network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether known at the time of filing or as later developed. In various embodiments, server system network interface 122 and I/O interface 105 include analog modems, digital modems, a network interface card, a broadband connection, or any other means for communicably coupling computing system 100, database 170, and server system 120, via network 130, whether known at the time of filing or as later developed.

Those of skill in the art will readily recognize that the components shown in FIG. 1, such as computing system 100, database 170, server system 120, and their respective components, are shown for illustrative purposes only and that architectures with more or fewer components can implement, and benefit from, a process for health care expense verification and reimbursement processing, such as processes for health care expense verification and reimbursement processing 200, 300 and 400, discussed below. Moreover, one or more components of computing system 100, database 170, and server system 120 may be located remotely from their respective system and accessed via network, as discussed herein. In addition, the particular type of, and configuration of, computing systems 100, database 170, and server system 120 are not relevant.

As discussed in more detail below, in one embodiment, a process for health care expense verification and reimbursement processing is stored in whole, or in part, in memory system 103 and/or cache memory 103A, of computing system 100, and/or in server memory system 123 of server system 120 and/or in database 170, and executed on computing system 100. As used herein, a memory refers to a volatile memory, a non-volatile memory, or any combination of the two.

Although a process for health care expense verification and reimbursement processing can sometimes be referred to herein, alternatively, as a process, an application, a module, a program, a component of a software system, a component of a software package, a component of a parent system, or a feature of a parent system, this terminology is illustrative only. In some embodiments, a process for health care expense verification and reimbursement processing is capable of being called from an application or the operating system. In one embodiment, an application or program is generally defined to be any executable code. Moreover, those of skill in the art will understand that when it is said that an application or an operation takes some action, the action is the result of executing one or more instructions by a processor, such as processor 101 or server system processor 121. In one embodiment, execution of a process for health care expense verification and reimbursement processing by processor 101 or server system processor 121, results in the operations of an agent computer process (not shown) and/or a rule computer process (not shown).

In one embodiment, a process for health care expense verification and reimbursement processing is a computer application or process implemented and/or run and/or stored, in full, or in part, in, or on, a computer program product. Herein, a computer program product comprises a medium configured to store and/or transport computer readable code, whether known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether known at the time of filing or as later developed. This medium may belong to a computing system, such as computing system 100 of FIG. 1, described above. However, the medium also may be removed from the computing system.

For example, all, or part, of a process for health care expense verification and reimbursement processing may be stored in a memory that is physically located in a location, such as server system memory 123, or database 170, of FIG. 1, different from a computing system, such as computing system 100 of FIG. 1, utilizing a process for health care expense verification and reimbursement processing. In one embodiment, all, or part, of a process for health care expense verification and reimbursement processing may be stored in a memory that is physically located, separate from the computing system's processor(s), such as processor 101 of FIG. 1, and the computing system processor(s) can be coupled to the memory in a client-server system, such as server system 120 of FIG. 1, or, alternatively, via connection to another computer, such as computing system 100 of FIG. 1, via modems and analog lines, digital interfaces and a digital carrier line, or wireless or cellular connections.

In one embodiment, the computing systems and/or server system, such as computing system 100 and/or server system 120 of FIG. 1, running and/or utilizing and/or storing all, or part, of a process for health care expense verification and reimbursement processing is a portable computer, a workstation, two-way pager, a cellular telephone, a smart phone, a digital wireless telephone, a personal digital assistant, a server computer, an Internet appliance, or any other device that includes components that can execute all, or part, of a process for health care expense verification and reimbursement processing in accordance with at least one of the embodiments as described herein. Similarly, in another embodiment, a process for health care expense verification and reimbursement processing is implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

In accordance with one embodiment, a method and system for health care expense verification and reimbursement processing includes a process for health care expense verification and reimbursement processing whereby electronic data including data representing health care expense transactions is collected. The electronic data is then analyzed and health care expense transactions that are potentially eligible for reimbursement from a health care expense account are identified. The identified health care expense transactions are then verified as eligible health care expense transactions based on the electronic data collected and/or the source of the electronic data. Data representing the verified health care expense transactions is then electronically, and in one embodiment, automatically, made available to a health care expense account program administrator for immediate reimbursement processing.

Herein, the terms "employee", "user", and/or "consumer" are used interchangeably to denote the beneficiary of a health care expense account program and/or the beneficiary's dependents and/or designated agent of the employee. Herein, the term "employer" is used to denote the party offering the health care expense account program as a benefit to the "employee". Herein, the terms "program administrator", "program manager", "health care expense account program administrator", and/or "health care expense account program manager" are used interchangeably to denote the party charged with administrating, processing, and making payments associated with reimbursement requests from the "employee".

Figure 2:
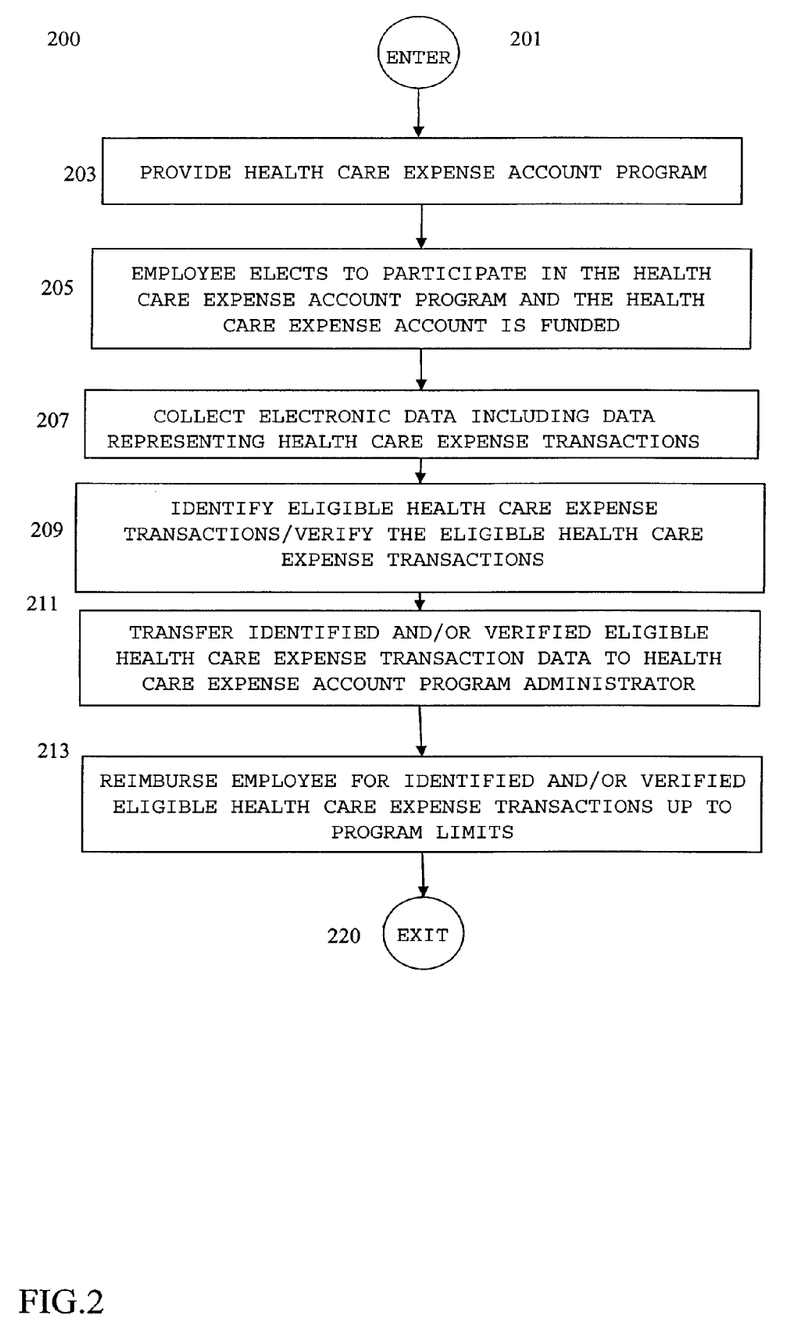
FIG. 2 is a flow chart depicting a process for health care expense verification and reimbursement processing in accordance with one embodiment.

FIG. 2 a flow chart depicting a process for health care expense verification and reimbursement processing 200 in accordance with one embodiment. Process for health care expense verification and reimbursement processing 200 begins at ENTER OPERATION 201 of FIG. 2 and process flow proceeds to PROVIDE HEALTH CARE EXPENSE ACCOUNT PROGRAM OPERATION 203.

In one embodiment, at PROVIDE HEALTH CARE EXPENSE ACCOUNT PROGRAM OPERATION 203 an employer offers a health care expense account program to the employee. As noted above, health care expense account programs are defined as programs which provide an employee and/or employee dependents a designated health care expense account that is assigned to the employee and is used to reimburse the employee for defined eligible health care expenses.

As also noted above, in many cases, the health care expense account is a virtual account maintained by a health care expense program administrator or management service, also called a program administrator, either under the direct control of the employer or as a third-party agent of the employer. In other cases, the health care expense account is set up by the employees themselves. Typically, health care expense accounts are funded by either the employee and/or the employer using pre-tax dollars.

As discussed above, health care expense account programs typically help the employee pay health care expenses that are not covered by the employee's health care insurance. Examples of health care expenses that are typically eligible for reimbursement under a health care expense account program include, but are not limited to: health care insurance deductibles; the employee's portion of health care expenses; co-payments for doctors visits and prescriptions; co-payments for medical supplies and devices; extended care and/or home care; and various other health care expenses determined to be eligible by the employer and/or health care expense program administrator.

In operation, funds are deposited in the health care expense account by the employee, the employer, or a combination of both. Once the health care expense account is funded, the funds are made available to reimburse the employee for out of pocket expenses incurred by the employee in eligible health care expense transactions. In most cases, the employee first pays the health care expense using his or her own funds. Then the employee makes a request to program administrator for reimbursement of the funds. The employee is reimbursed for his or her out of pocket expenses from the health care expense account.

Examples of common health care expense account programs currently available include, but are not limited to: flexible spending accounts (FSAs); health care reimbursement arrangements (HRAs); and health care spending accounts (HSAs). Each of these health care expense account programs operate to reimburse the employee for out of pocket expenses incurred by the employee in eligible health care expense transactions. However, the funding, lifespan, and portability of these three programs vary.

For instance, in a typical flexible spending account (FSA) program the employee must elect to deposit a specified pre-tax dollar amount in the health care expense account, i.e., the FSA, to cover health care expenses that will occur over a predefined future period. For instance, as one example, the employee must elect to deposit a pre-tax dollar amount specified by the employee to be paid into the health care expense account for pre-tax reimbursement of all eligible health care expenses to be incurred in the next 12 months. In many cases, the amount specified by the employee is paid by deducting a portion of the specified amount from the employee's compensation over multiple pay periods. In other cases, the employer makes contributions to the FSA and the employer deposits funds in the health care expense account on a periodic basis.

Using a typical FSA, it is important that an employee predict his or her total eligible health care expenses fairly accurately. This is because any funds not used to reimburse the employee for a transaction occurring within the predefined period, i.e., unused funds, are typically forfeited. Consequently, an underestimate of the employee's total eligible health care expenses results in "real" post tax expense while an overestimate of the total eligible health care expenses results in forfeited pre-tax money. FSAs are the most common form of health care expense account programs. Given the forfeiture feature of the typical FSA, timely and accurate submission of reimbursement requests is critical.

A typical health care reimbursement arrangement (HRA) is very similar to an FSA except that the HRA account is typically funded by the employer and, in many cases, the health care expense account balance remains for employee to use as long as the employee is employed by the employer.

Health care spending accounts (HSAs) are a federal program whereby a user and/or employer funds the health care spending account themselves with pre-tax dollars. The user then reimburses himself or herself from the account for eligible health care expenses. A health care spending account remains the property of the user for life. However, funds drawn from the health care spending account prior to the defined retirement age must be identified, accounted for, and verified through special tax documentation.

Any health care expense account program, whether it be an FSA, an HRA, an HSA, or any other health care expense account-type program, known at the time of filing or as developed thereafter, can be used with, and benefit from, the processes for health care expense verification and reimbursement processing disclosed herein. In one embodiment, once a health care expense account program is offered at PROVIDE HEALTH CARE EXPENSE ACCOUNT PROGRAM OPERATION 203, process flow proceeds to EMPLOYEE ELECTS TO PARTICIPATE IN THE HEALTH CARE EXPENSE ACCOUNT PROGRAM AND THE HEALTH CARE EXPENSE ACCOUNT IS FUNDED OPERATION 205.

In one embodiment, at EMPLOYEE ELECTS TO PARTICIPATE IN THE HEALTH CARE EXPENSE ACCOUNT PROGRAM AND THE HEALTH CARE EXPENSE ACCOUNT IS FUNDED OPERATION 205 an employee elects to participate in the health care expense account program of PROVIDE HEALTH CARE EXPENSE ACCOUNT PROGRAM OPERATION 203. As a result of the election to participate a health care expense account is opened for the employee as described above and/or the health care expense account is funded by one of the funding mechanisms also discussed above. In one embodiment, once the employee elects to participate in the health care expense account program and a health care expense account is opened and/or funded at EMPLOYEE ELECTS TO PARTICIPATE IN THE HEALTH CARE EXPENSE ACCOUNT PROGRAM AND THE HEALTH CARE EXPENSE ACCOUNT IS FUNDED OPERATION 205, process flow proceeds to COLLECT ELECTRONIC DATA INCLUDING DATA REPRESENTING HEALTH CARE EXPENSE TRANSACTIONS OPERATION 207.

In one embodiment, at COLLECT ELECTRONIC DATA INCLUDING DATA REPRESENTING HEALTH CARE EXPENSE TRANSACTIONS OPERATION 207 electronic data including data representing health care expense transactions is collected from one or more sources.

In one embodiment, electronic data including data representing health care expense transactions is collected from electronically transferred Explanation of Benefits (EOB) data provided to process for health care expense verification and reimbursement processing 200 by a health insurance provider.

As required by law, EOBs are forms that health insurance providers send insured parties for each benefit claim made by either the insured or the health care provider on behalf of the insured. EOBs include various types of information but typically include: information as to the amount of a given claim; information as to the amount paid by the health insurance provider on a given claim; information regarding any amounts not paid on a given claim by the health insurance provider, and why the amounts were not paid; and information regarding any amounts not paid on a given claim by the health insurance provider that it is the responsibility of the insured, or the responsible insured party, i.e., the employee, to pay.

According to one embodiment, the health insurance providers transfer electronic copies of the EOBs, often in specific formats, to the provider of process for health care expense verification and reimbursement processing 200. In one embodiment, electronic copies of the EOB data are created and the data is stored, in whole, or in part, in a database maintained by, accessible by, owned by, or otherwise related to, a provider of process for health care expense verification and reimbursement processing 200 and/or the health insurance provider by any one of the numerous mechanisms known to those of skill in the art. For instance, in one embodiment, the data, in whole, or in part, is stored in a memory system, such as memory system 103 or server memory system 123, or database 170, of FIG. 1, or in a cache memory, such as cache memory 103A of FIG. 1, or in any main memory or mass memory, associated with a computing device, such as computing system 100 described above. In one embodiment, the data, in whole, or in part, is stored in any computing device and/or server system, such as computing system 100 or server system 120, or other device, in another location, or on/in a computer readable medium, and/or any other computer program product, as defined herein. In one embodiment, the data, in whole, or in part, is stored on a webpage, in a web-based system or on a public network such as the Internet. Returning to FIG. 2, in some embodiments, the data stored as described above is maintained, in whole, or in part, by: the provider of process for health care expense verification and reimbursement processing 200; the health insurance provider; a third party data storage institution; any third party service or institution; or any other parties. In these embodiments, access to the EOB data is then granted to the provider of process for health care expense verification and reimbursement processing 200 at COLLECT ELECTRONIC DATA INCLUDING DATA REPRESENTING HEALTH CARE EXPENSE TRANSACTIONS OPERATION 207 by providing access to the data and/or providing the data on a computer program product.

In other embodiments, the EOB data is provided through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

In other embodiments, the EOB data is provided through e-mail or through text messaging. In other embodiments, the EOB data is provided to process for health care expense verification and reimbursement processing 200 through any method, apparatus, process or mechanism for transferring data and/or text from one or more devices, computing systems, server systems, databases, web site/web functions and/or any devices having a data storage capability to one or more other devices, computing systems, server systems, databases, web site/web functions and/or any devices having a data storage capability, whether known at he time of filing or as thereafter developed.

Returning to FIG. 2, in one embodiment, the electronic data including data representing health care expense transactions is collected through electronically transferred invoices/patient bills and/or claim data provided to process for health care expense verification and reimbursement processing 200 by health care providers such as hospitals and/or doctors and/or other medical service personnel.

Invoices submitted to the patient/employee by the health care providers, such as hospitals and/or doctors typically include total cost billed as well as the expected patient/employee's share of that cost. In addition, copies of clams made to the health insurance providers often include this same information.

According to one embodiment, the health care providers transfer electronic copies of the invoices/claims, often in specific formats, to the provider of process for health care expense verification and reimbursement processing 200. In one embodiment, electronic copies of the invoice/claim data are created and the data is stored, in whole, or in part, in a database maintained by, accessible by, owned by, or otherwise related to, a provider of process for health care expense verification and reimbursement processing 200 and/or the health care provider by any one of the numerous mechanisms known to those of skill in the art. For instance, in one embodiment, the data, in whole, or in part, is stored in a memory system, such as memory system 103 or server memory system 123, or database 170, of FIG. 1, or in a cache memory, such as cache memory 103A of FIG. 1, or in any main memory or mass memory, associated with a computing device, such as computing system 100 described above. In one embodiment, the data, in whole, or in part, is stored in any computing device and/or server system, such as computing system 100 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the data stored as described above is maintained, in whole, or in part, by: the provider of process for health care expense verification and reimbursement processing 200; the health care provider; a third party data storage institution; any third party service or institution; or any other parties. In these embodiments, access to the invoice/claim data is then granted to the provider of process for health care expense verification and reimbursement processing 200 at COLLECT ELECTRONIC DATA INCLUDING DATA REPRESENTING HEALTH CARE EXPENSE TRANSACTIONS OPERATION 207 by providing access to the data and/or providing the data on a computer program product.

In other embodiments, the invoice/claim data is provided through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

Returning to FIG. 2, in other embodiments, the invoice/claim data is provided through e-mail or through text messaging. In other embodiments, the invoice/claim data is provided to process for health care expense verification and reimbursement processing 200 through any method, apparatus, process or mechanism for transferring data and/or text from one or more devices, computing systems, server systems, databases, web site/web functions and/or any devices having a data storage capability to one or more other devices, computing systems, server systems, databases, web site/web functions and/or any devices having a data storage capability, whether known at he time of filing or as thereafter developed.

In one embodiment, the electronic data including data representing health care expense transactions is collected from electronic transaction data maintained by banks and/or credit account providers.

In one embodiment, access to historical payment/transaction data for the employee is obtained, typically in electronic format, by one of numerous methods known to those of skill in the art.

In one embodiment, the historical payment data is obtained from a financial institution, such as a bank or credit union, using the Open Financial Exchange (OFX) specification. OFX is a specification for the electronic exchange of financial data between financial institutions, businesses, consumers, and other users and user processes, such process for health care expense verification and reimbursement processing 200, or a parent system implementing process for health care expense verification and reimbursement processing 200, via the Internet. OFX was created in early 1997 and is well known to those of skill in the art. OFX supports a wide range of financial activities including consumer and small business banking, consumer and small business bill payment, bill presentment, payment history displays, and investments tracking, including stocks, bonds, mutual funds, 401(k), and bank account details. OFX enables transactional, permissive, data feed driven Web sites, such as bank websites, thin clients, and financial software systems, to operate and communicate, easily, seamlessly and securely. Consequently, in one embodiment, using OFX, historical payment data can be made readily available to process for health care expense verification and reimbursement processing 200 and/or a parent system implementing process for health care expense verification and reimbursement processing 200 at COLLECT ELECTRONIC DATA INCLUDING DATA REPRESENTING HEALTH CARE EXPENSE TRANSACTIONS OPERATION 207.

As noted, the OFX specification is well known to those of skill in the art and is publicly available for implementation by any financial institution or vendor. As of March 2004, OFX is supported by over 2000 banks and brokerages as well as major payroll processing companies. The latest version of OFX is 2.0.2.

In one embodiment, the historical payment data is obtained from a financial institution, such as a bank or union, using any other method for accessing the historical payment history, and allowing COLLECT ELECTRONIC DATA INCLUDING DATA REPRESENTING HEALTH CARE EXPENSE TRANSACTIONS OPERATION 207 to scan the data, as described below, including manual entry of the data. In one embodiment, process for health care expense verification and reimbursement processing 200 is part of a parent personal health expense management, financial, business financial, accounting, or tax preparation software system, program, package or application that implements a process for health care expense verification and reimbursement processing, such as process for health care expense verification and reimbursement processing 200, as one of multiple features. Some of these parent systems, have the capability to gather payment data, often using OFX, and then store the data for use by process for health care expense verification and reimbursement processing 200 in one of numerous locations by one of numerous methods known to those of skill in the art.

In some embodiments, the historical payment data is obtained by accessing data already stored in another system or from a memory system, such as memory system 103 or server memory system 123, or database 170, of FIG. 1, or in a cache memory, such as cache memory 103A of FIG. 1, or in any main memory or mass memory, associated with a computing system, such as computing system 100 described above. In one embodiment, the data, in whole, or in part, is stored in any computing system and/or server system, such as computing system 100 or server system 120, or other device, in another location, or on/in computer readable medium, and/or any other computer program product, as defined herein. In one embodiment, the data, in whole, or in part, is stored on a webpage or in a web-based system.

Returning to FIG. 2, in some embodiments, the means for storing the data described above is maintained, in whole, or in part, by: the user, or a user computing system; the financial institution; the provider of process for health care expense verification and reimbursement processing 200; the provider of a parent system; or any other parties.

As noted above, several methods for obtaining historical payment data including data representing health care expense transactions from electronic transaction data maintained by banks and/or credit account providers are well known to those of skill in the art. Consequently, these various methods for obtaining historical payment data are not discussed further herein to avoid detracting from the disclosure.

In one embodiment, the electronic data including data representing health care expense transactions is collected from electronic receipts provided by suppliers of medications and/or medical devices and/or supplies. According to one embodiment, the suppliers transfer electronic copies of the receipts, often in specific formats, to the provider of process for health care expense verification and reimbursement processing 200. In one embodiment, electronic copies of the receipt data are created and the data is stored, in whole, or in part, in a database maintained by, accessible by, owned by, or otherwise related to, a provider of process for health care expense verification and reimbursement processing 200 and/or the suppliers by any one of the numerous mechanisms known to those of skill in the art. For instance, in one embodiment, the data, in whole, or in part, is stored in a memory system, such as memory system 103 or server memory system 123, or database 170, of FIG. 1, or in a cache memory, such as cache memory 103A of FIG. 1, or in any main memory or mass memory, associated with a computing device, such as computing system 100 described above. In one embodiment, the data, in whole, or in part, is stored in any computing device and/or server system, such as computing system 100 or server system 120, or other device, in another location, or on/in a computer readable medium, and/or any other computer program product, as defined herein. In one embodiment, the data, in whole, or in part, is stored on a webpage, in a web-based system or on a public network such as the Internet. In some embodiments, the data stored as described above is maintained, in whole, or in part, by: the provider of process for health care expense verification and reimbursement processing 200; the suppliers; a third party data storage institution; any third party service or institution; or any other parties. Returning to FIG. 2, in these embodiments, access to the receipt data is then granted to the provider of process for health care expense verification and reimbursement processing 200 at COLLECT ELECTRONIC DATA INCLUDING DATA REPRESENTING HEALTH CARE EXPENSE TRANSACTIONS OPERATION 207 by providing access to the data and/or providing the data on a computer program product.

In other embodiments, the receipt data is provided through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

Returning to FIG. 2, in other embodiments, the receipt data is provided through e-mail or through text messaging. In other embodiments, the receipt data is provided to process for health care expense verification and reimbursement processing 200 through any method, apparatus, process or mechanism for transferring data and/or text from one or more devices, computing systems, server systems, databases, web site/web functions and/or any devices having a data storage capability to one or more other devices, computing systems, server systems, databases, web site/web functions and/or any devices having a data storage capability, whether known at he time of filing or as thereafter developed.

In some embodiments, the electronic data including data representing health care expense transactions is collected at COLLECT ELECTRONIC DATA INCLUDING DATA REPRESENTING HEALTH CARE EXPENSE TRANSACTIONS OPERATION 207 from any combination of the above sources and/or from any other source of electronic data including data representing health care expense transactions, whether known at the time of filing or as developed thereafter.

In one embodiment, once the electronic data including data representing health care expense transactions is collected, the data is also saved at COLLECT ELECTRONIC DATA INCLUDING DATA REPRESENTING HEALTH CARE EXPENSE TRANSACTIONS OPERATION 207 by storing the data by any of the methods discussed herein and/or known to those of skill in the art, whether known a the time of filing or as developed later. In one embodiment, once the electronic data including data representing health care expense transactions is collected from one or more of various sources at COLLECT ELECTRONIC DATA INCLUDING DATA REPRESENTING HEALTH CARE EXPENSE TRANSACTIONS OPERATION 207, process flow proceeds to IDENTIFY ELIGIBLE HEALTH CARE EXPENSE TRANSACTIONS/VERIFY THE ELIGIBLE HEALTH CARE EXPENSE TRANSACTIONS OPERATION 209.

In one embodiment, at IDENTIFY ELIGIBLE HEALTH CARE EXPENSE TRANSACTIONS/VERIFY THE ELIGIBLE HEALTH CARE EXPENSE TRANSACTIONS OPERATION 209 the electronic data including data representing health care expense transactions from COLLECT ELECTRONIC DATA INCLUDING DATA REPRESENTING HEALTH CARE EXPENSE TRANSACTIONS OPERATION 207 is analyzed to identify health care expense transactions that are potentially eligible for reimbursement through the health care expense account program. The identified health care expense transactions are then verified by various means dependent on the source of the electronic data.

In one embodiment, the electronically transferred EOB data provided by health insurance providers at COLLECT ELECTRONIC DATA INCLUDING DATA REPRESENTING HEALTH CARE EXPENSE TRANSACTIONS OPERATION 207 is analyzed to identify the employee's portion of payments made to the health care provider and/or any co-payments made by the employee. In one embodiment, the eligible health care expense transactions are then considered verified based on the fact the source of the data is the health insurance provider.

In one embodiment, the electronically transferred invoices/patient bills provided by health care providers at COLLECT ELECTRONIC DATA INCLUDING DATA REPRESENTING HEALTH CARE EXPENSE TRANSACTIONS OPERATION 207 are analyzed to identify the amount billed directly to the employee by the health care providers. In one embodiment, the eligible health care expense transactions are then considered verified based again on the source of the data.

In one embodiment electronic transaction data maintained by banks and/or credit account providers is obtained and analyzed to identify potential health care expense transactions based on an assigned category of transaction and/or the merchant paid through the transaction. In one embodiment, the electronic transaction data maintained by banks and/or credit account providers is analyzed to identify potential health care expense transactions and/or verify the eligible health care expense transactions using "level-3" transaction data.

Level-3 transaction data refers to the ability to process detailed purchase information with the financial transaction. The supplemental information associated with level-3 transaction data typically includes data elements such as a customer/employee code, invoice and service order number, part number, item description, quantity, unit of measure, unit price, etc. Using level-3 data, transactional details are provided that allow a determination as to exactly what was purchased and, in this instance, if the item and/or service purchased represents an eligible health care expense. Consequently, in one embodiment, level-3 data is used to both identify and verify eligible health care expense transactions from the electronic transaction data maintained by banks and/or credit account providers.

In one embodiment, the electronic receipts provided by suppliers of medications and/or medical devices/supplies at COLLECT ELECTRONIC DATA INCLUDING DATA REPRESENTING HEALTH CARE EXPENSE TRANSACTIONS OPERATION 207 are analyzed to identify potential health care expense transactions. The health care expense transactions are then verified based on the seller and the item description on the receipt, i.e., the data identifying specific items purchased, the date of purchase, and the price paid by the employee.

In one embodiment, the electronic data including data representing health care expense transactions is analyzed and eligible health care expense transactions are identified and verified at IDENTIFY ELIGIBLE HEALTH CARE EXPENSE TRANSACTIONS/VERIFY THE ELIGIBLE HEALTH CARE EXPENSE TRANSACTIONS OPERATION 209 by any combination of the methods described above and/or any other method of scanning electronic data to identify and verify eligible health care expense transactions, whether known at the time of filing or as developed thereafter.

In one embodiment, once the electronic data is analyzed to identify health care expense transactions and the identified health care expense transactions are verified as eligible for reimbursement at IDENTIFY ELIGIBLE HEALTH CARE EXPENSE TRANSACTIONS/VERIFY THE ELIGIBLE HEALTH CARE EXPENSE TRANSACTIONS OPERATION 209, process flow proceeds to TRANSFER IDENTIFIED AND/OR VERIFIED ELIGIBLE HEALTH CARE EXPENSE TRANSACTION DATA TO HEALTH CARE EXPENSE ACCOUNT PROGRAM ADMINISTRATOR OPERATION 211.

In one embodiment, at TRANSFER IDENTIFIED AND/OR VERIFIED ELIGIBLE HEALTH CARE EXPENSE TRANSACTION DATA TO HEALTH CARE EXPENSE ACCOUNT PROGRAM ADMINISTRATOR OPERATION 211, data representing the identified and verified eligible health care expense transactions is made available to the health care expense account program administrator, also called a program administrator.

In one embodiment, data representing the identified and verified eligible health care expense transactions is made available to the program administrator by storing the data, in whole, or in part, in a database maintained by, accessible by, owned by, or otherwise related to, a provider of process for health care expense verification and reimbursement processing 200 and/or provider of the health care expense account program by any one of the numerous mechanisms known to those of skill in the art. For instance, in one embodiment, the data, in whole, or in part, is stored in a memory system, such as memory system 103 or server memory system 123, or database 170, of FIG. 1, or in a cache memory, such as cache memory 103A of FIG. 1, or in any main memory or mass memory, associated with a computing device, such as computing system 100 described above. In one embodiment, the data, in whole, or in part, is stored in any computing device and/or server system, such as computing system 100 or server system 120, or other device, in another location, or on/in a computer readable medium, and/or any other computer program product, as defined herein. In one embodiment, the data, in whole, or in part, is stored on a webpage, in a web-based system or on a public network such as the Internet.

In some embodiments, the data stored as described above is maintained, in whole, or in part, by: the provider of process for health care expense verification and reimbursement processing 200; the provider of the health care expense account program; a third party data storage institution; any third party service or institution; or any other parties.

Returning to FIG. 2, in these embodiments, the data representing the identified and verified eligible health care expense transactions is made available to the program administrator by granting the program administrator and/or program administrators computing system access to the data and/or providing the data on a computer program product.

In other embodiments, data representing the identified and verified eligible health care expense transactions is provided to the program administrator through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

Returning to FIG. 2, in other embodiments, the data representing the identified and verified eligible health care expense transactions is made available to the program administrator through e-mail or through text messaging. In other embodiments, the data representing the identified and verified eligible health care expense transactions is made available to the program administrator through any method, apparatus, process or mechanism for transferring data and/or text from one or more devices, computing systems, server systems, databases, web site/web functions and/or any devices having a data storage capability to one or more other devices, computing systems, server systems, databases, web site/web functions and/or any devices having a data storage capability, whether known at he time of filing or as thereafter developed.

In one embodiment, the data representing the identified and verified eligible health care expense transactions is made available to the program administrator by automatically transferring the data to a program administrator's computing system and/or storage device by any of the methods and/or mechanisms discussed herein.

In one embodiment, once the data representing the identified and verified eligible health care expense transactions is transferred to the program administrator, the program administrator then processes the reimbursement. In one embodiment, processing the reimbursement involves checking to ensure the balance in the employee's health care expense account is sufficient to cover the reimbursement. In cases where the health care expense account is funded over multiple pay periods as discussed above, processing the reimbursement involves waiting until sufficient funds have been deposited into the employee's health care expense account and/or paying out the reimbursement in installments as the funding of the employee's health care expense account is received, In one embodiment, once the data representing the identified and verified eligible health care expense transactions is transferred to the program administrator at TRANSFER IDENTIFIED AND/OR VERIFIED ELIGIBLE HEALTH CARE EXPENSE TRANSACTION DATA TO HEALTH CARE EXPENSE ACCOUNT PROGRAM ADMINISTRATOR OPERATION 211, process flow proceeds to REIMBURSE EMPLOYEE FOR IDENTIFIED AND/OR VERIFIED ELIGIBLE HEALTH CARE EXPENSE TRANSACTIONS UP TO PROGRAM LIMITS OPERATION 213.

In one embodiment, at REIMBURSE EMPLOYEE FOR IDENTIFIED AND/OR VERIFIED ELIGIBLE HEALTH CARE EXPENSE TRANSACTIONS UP TO PROGRAM LIMITS OPERATION 213 the employee/consumer is reimbursed as soon as funds are available in the employee's health care expense account as discussed above.

In one embodiment, once the employee/consumer is reimbursed, or scheduled to be reimbursed, at REIMBURSE EMPLOYEE FOR IDENTIFIED AND/OR VERIFIED ELIGIBLE HEALTH CARE EXPENSE TRANSACTIONS UP TO PROGRAM LIMITS OPERATION 213, process flow proceeds to EXIT OPERATION 220 and process for health care expense verification and reimbursement processing 200 returns to COLLECT ELECTRONIC DATA INCLUDING DATA REPRESENTING HEALTH CARE EXPENSE TRANSACTIONS OPERATION 207 to await the next cycle and/or transaction.

In one embodiment, eligible health care expense transactions are further verified and/or authenticated by checking the subject matter and/or purchased items associated with the health care expense transactions against a listing of eligible (or non-eligible) health care expenses. In one embodiment, the listing of eligible (or non-eligible) health care expenses is provided by the employer and/or program administrator.

Figure 3:
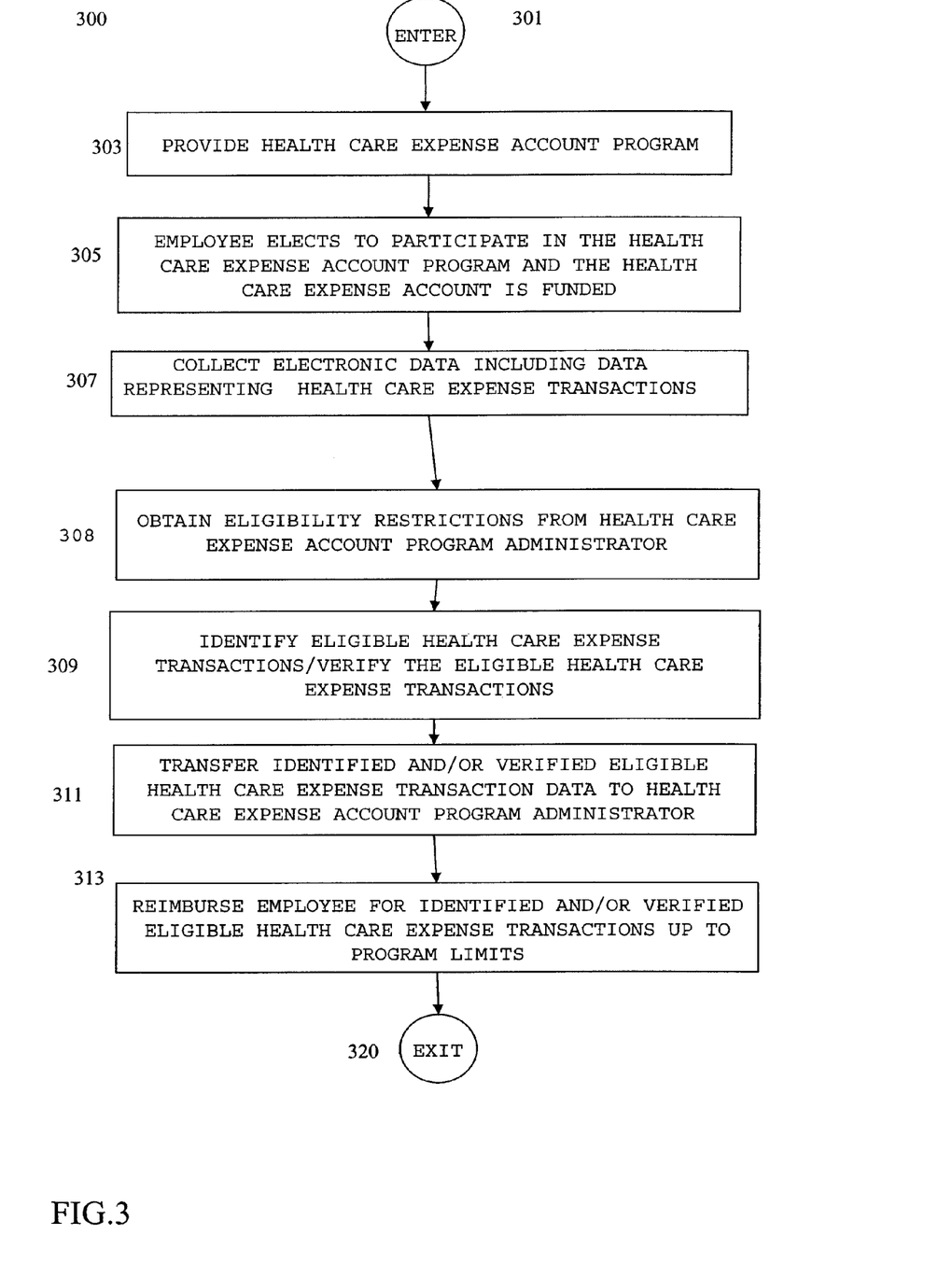
FIG. 3 is a flow chart depicting a process for health care expense verification and reimbursement processing in accordance with one embodiment.

FIG. 3 a flow chart depicting a process for health care expense verification and reimbursement processing 300 in accordance with one embodiment. Process for health care expense verification and reimbursement processing 300 begins at ENTER OPERATION 301 of FIG. 3 and process flow proceeds to PROVIDE HEALTH CARE EXPENSE ACCOUNT PROGRAM OPERATION 303.

In one embodiment: PROVIDE HEALTH CARE EXPENSE ACCOUNT PROGRAM OPERATION 303; EMPLOYEE ELECTS TO PARTICIPATE IN THE HEALTH CARE EXPENSE ACCOUNT PROGRAM AND THE HEALTH CARE EXPENSE ACCOUNT IS FUNDED OPERATION 305; and COLLECT ELECTRONIC DATA INCLUDING DATA REPRESENTING HEALTH CARE EXPENSE TRANSACTIONS OPERATION 307 of FIG. 3 and process for health care expense verification and reimbursement processing 300 are substantially identical to PROVIDE HEALTH CARE EXPENSE ACCOUNT PROGRAM OPERATION 203; EMPLOYEE ELECTS TO PARTICIPATE IN THE HEALTH CARE EXPENSE ACCOUNT PROGRAM AND THE HEALTH CARE EXPENSE ACCOUNT IS FUNDED OPERATION 205; and COLLECT ELECTRONIC DATA INCLUDING DATA REPRESENTING HEALTH CARE EXPENSE TRANSACTIONS OPERATION 207 of FIG. 2 and process for health care expense verification and reimbursement processing 200 discussed above. Consequently, the discussion above of FIG. 2 is applicable to, and incorporated here for: PROVIDE HEALTH CARE EXPENSE ACCOUNT PROGRAM OPERATION 303; EMPLOYEE ELECTS TO PARTICIPATE IN THE HEALTH CARE EXPENSE ACCOUNT PROGRAM AND THE HEALTH CARE EXPENSE ACCOUNT IS FUNDED OPERATION 305; and COLLECT ELECTRONIC DATA INCLUDING DATA REPRESENTING HEALTH CARE EXPENSE TRANSACTIONS OPERATION 307 of FIG. 3 and process for health care expense verification and reimbursement processing 300.

In one embodiment, once the electronic data including data representing health care expense transactions is collected from one or more sources at COLLECT ELECTRONIC DATA INCLUDING DATA REPRESENTING HEALTH CARE EXPENSE TRANSACTIONS OPERATION 307, process flow proceeds to OBTAIN ELIGIBILITY RESTRICTIONS FROM HEALTH CARE EXPENSE ACCOUNT PROGRAM ADMINISTRATOR OPERATION 308.

In one embodiment, at OBTAIN ELIGIBILITY RESTRICTIONS FROM HEALTH CARE EXPENSE ACCOUNT PROGRAM ADMINISTRATOR OPERATION 308 a listing of eligible (or non-eligible) health care expenses is provided to process for health care expense verification and reimbursement processing 300 by the employer and/or program administrator. As an example, the employer and/or program administrator may specifically exclude certain treatments, types of treatments, medications, types of medications and/or procedures from being eligible health care expenses under the health care expense account program.

In one embodiment, the listing of eligible (or non-eligible) health care expenses is provided to process for health care expense verification and reimbursement processing 300 by manual data entry. In one embodiment, the listing of eligible (or non-eligible) health care expenses is provided to process for health care expense verification and reimbursement processing 300 in an electronic data transfer by any of the methods and/or means discussed herein.

In one embodiment, once the listing of eligible (or non-eligible) health care expenses is provided to process for health care expense verification and reimbursement processing 300 by the employer and/or program administrator at OBTAIN ELIGIBILITY RESTRICTIONS FROM HEALTH CARE EXPENSE ACCOUNT PROGRAM ADMINISTRATOR OPERATION 308, process flow proceeds to IDENTIFY ELIGIBLE HEALTH CARE EXPENSE TRANSACTIONS/ VERIFY THE ELIGIBLE HEALTH CARE EXPENSE TRANSACTIONS OPERATION 309.

In one embodiment, IDENTIFY ELIGIBLE HEALTH CARE EXPENSE TRANSACTIONS/VERIFY THE ELIGIBLE HEALTH CARE EXPENSE TRANSACTIONS OPERATION 309 is substantially similar to IDENTIFY ELIGIBLE HEALTH CARE EXPENSE TRANSACTIONS/ VERIFY THE ELIGIBLE HEALTH CARE EXPENSE TRANSACTIONS OPERATION 209 discussed above with respect to FIG. 2 and process for health care expense verification and reimbursement processing 200. Consequently, the discussion above with respect to IDENTIFY ELIGIBLE HEALTH CARE EXPENSE TRANSACTIONS/VERIFY THE ELIGIBLE HEALTH CARE EXPENSE TRANSACTIONS OPERATION 209 is equally applicable to, and is incorporated here for IDENTIFY ELIGIBLE HEALTH CARE EXPENSE TRANSACTIONS/VERIFY THE ELIGIBLE HEALTH CARE EXPENSE TRANSACTIONS OPERATION 309 of FIG. 3.

In addition to performing the identification and verification conducted at IDENTIFY ELIGIBLE HEALTH CARE EXPENSE TRANSACTIONS/VERIFY THE ELIGIBLE HEALTH CARE EXPENSE TRANSACTIONS OPERATION 209 of FIG. 2, at IDENTIFY ELIGIBLE HEALTH CARE EXPENSE TRANSACTIONS/VERIFY THE ELIGIBLE HEALTH CARE EXPENSE TRANSACTIONS OPERATION 309 of FIG. 3 the identified potential eligible health care expense transactions are further verified by checking the subject matter and/or purchase items associated with the health care expense transactions against the listing of eligible (or non-eligible) health care expenses of OBTAIN ELIGIBILITY RESTRICTIONS FROM HEALTH CARE EXPENSE ACCOUNT PROGRAM ADMINISTRATOR OPERATION 308.

In one embodiment, once the electronic data is analyzed to identify health care expense transactions that are potentially eligible for reimbursement and the identified health care expense transactions are verified and checked against the listing of eligible (or non-eligible) health care expenses at IDENTIFY ELIGIBLE HEALTH CARE EXPENSE TRANSACTIONS/VERIFY THE ELIGIBLE HEALTH CARE EXPENSE TRANSACTIONS OPERATION 309, process flow proceeds to TRANSFER IDENTIFIED AND/OR VERIFIED ELIGIBLE HEALTH CARE EXPENSE TRANSACTIONS TO HEALTH CARE EXPENSE ACCOUNT PROGRAM ADMINISTRATOR OPERATION 311. TRANSFER IDENTIFIED AND/OR VERIFIED ELIGIBLE HEALTH CARE EXPENSE TRANSACTIONS TO HEALTH CARE EXPENSE ACCOUNT PROGRAM ADMINISTRATOR OPERATION 311 and REIMBURSE EMPLOYEE FOR IDENTIFIED AND/OR VERIFIED ELIGIBLE HEALTH CARE EXPENSE TRANSACTIONS UP TO PROGRAM LIMITS OPERATION 313 are substantially identical to TRANSFER IDENTIFIED AND/OR VERIFIED ELIGIBLE HEALTH CARE EXPENSE TRANSACTION DATA TO HEALTH CARE EXPENSE ACCOUNT PROGRAM ADMINISTRATOR OPERATION 211 and REIMBURSE EMPLOYEE FOR IDENTIFIED AND/OR VERIFIED ELIGIBLE HEALTH CARE EXPENSE TRANSACTIONS UP TO PROGRAM LIMITS OPERATION 213 discussed above with respect to FIG. 2 and process for health care expense verification and reimbursement processing 200. Consequently, the discussion above with respect to TRANSFER IDENTIFIED AND/OR VERIFIED ELIGIBLE HEALTH CARE EXPENSE TRANSACTION DATA TO HEALTH CARE EXPENSE ACCOUNT PROGRAM ADMINISTRATOR OPERATION 211 and REIMBURSE EMPLOYEE FOR IDENTIFIED AND/OR VERIFIED ELIGIBLE HEALTH CARE EXPENSE TRANSACTIONS UP TO PROGRAM LIMITS OPERATION 213 is equally applicable to, and is incorporated here for, TRANSFER IDENTIFIED AND/OR VERIFIED ELIGIBLE HEALTH CARE EXPENSE TRANSACTIONS TO HEALTH CARE EXPENSE ACCOUNT PROGRAM ADMINISTRATOR OPERATION 311 and REIMBURSE EMPLOYEE FOR IDENTIFIED AND/OR VERIFIED ELIGIBLE HEALTH CARE EXPENSE TRANSACTIONS UP TO PROGRAM LIMITS OPERATION 313 of FIG. 3.

In one embodiment, once the employee/consumer is reimbursed, or scheduled to be reimbursed, at REIMBURSE EMPLOYEE FOR IDENTIFIED AND/OR VERIFIED ELIGIBLE HEALTH CARE EXPENSE TRANSACTIONS UP TO PROGRAM LIMITS OPERATION 313, process flow proceeds to EXIT OPERATION 320 and process for health care expense verification and reimbursement processing 300 returns to COLLECT ELECTRONIC DATA INCLUDING DATA REPRESENTING HEALTH CARE EXPENSE TRANSACTIONS OPERATION 307 to await the next cycle and/or transaction.

In one embodiment, eligible health care expense transactions are also verified by the employee. In this embodiment, the employee is provided a listing of potentially eligible health care expense transactions. The employee is then provided the opportunity to edit the list and/or remove specific potentially eligible health care expense transactions from the listing prior to submission to the program administrator.

Figure 4:
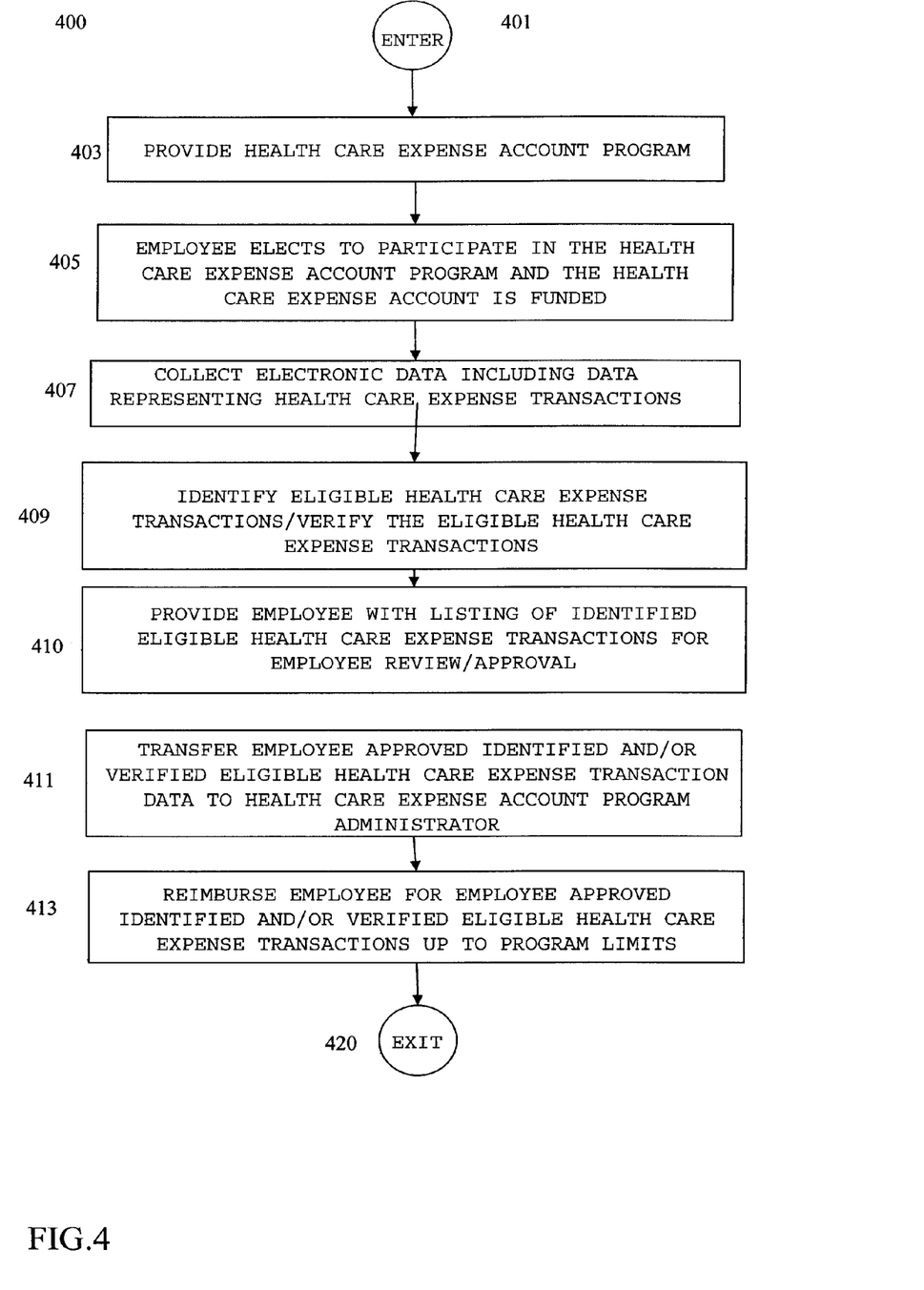
FIG. 4 is a flow chart depicting a process for health care expense verification and reimbursement processing in accordance with one embodiment.

FIG. 4 a flow chart depicting a process for health care expense verification and reimbursement processing 400 in accordance with one embodiment. Process for health care expense verification and reimbursement processing 400 begins at ENTER OPERATION 401 of FIG. 4 and process flow proceeds to PROVIDE HEALTH CARE EXPENSE ACCOUNT PROGRAM OPERATION 403.

In one embodiment: PROVIDE HEALTH CARE EXPENSE ACCOUNT PROGRAM OPERATION 403; EMPLOYEE ELECTS TO PARTICIPATE IN THE HEALTH CARE EXPENSE ACCOUNT PROGRAM AND THE HEALTH CARE EXPENSE ACCOUNT IS FUNDED OPERATION 405; COLLECT ELECTRONIC DATA INCLUDING DATA REPRESENTING HEALTH CARE EXPENSE TRANSACTIONS OPERATION 407; and IDENTIFY ELIGIBLE HEALTH CARE EXPENSE TRANSACTIONS/VERIFY THE ELIGIBLE HEALTH CARE EXPENSE TRANSACTIONS OPERATION 409 of process for health care expense verification and reimbursement processing 400 of FIG. 4 are substantially identical to PROVIDE HEALTH CARE EXPENSE ACCOUNT PROGRAM OPERATION 203; EMPLOYEE ELECTS TO PARTICIPATE IN THE HEALTH CARE EXPENSE ACCOUNT PROGRAM AND THE HEALTH CARE EXPENSE ACCOUNT IS FUNDED OPERATION 205; COLLECT ELECTRONIC DATA INCLUDING DATA REPRESENTING HEALTH CARE EXPENSE TRANSACTIONS OPERATION 207; and IDENTIFY ELIGIBLE HEALTH CARE EXPENSE TRANSACTIONS/VERIFY THE ELIGIBLE HEALTH CARE EXPENSE TRANSACTIONS OPERATION 409 of FIG. 2 and process for health care expense verification and reimbursement processing 200 discussed above. Consequently, the discussion above of FIG. 2 is applicable to, and incorporated here for: PROVIDE HEALTH CARE EXPENSE ACCOUNT PROGRAM OPERATION 403; EMPLOYEE ELECTS TO PARTICIPATE IN THE HEALTH CARE EXPENSE ACCOUNT PROGRAM AND THE HEALTH CARE EXPENSE ACCOUNT IS FUNDED OPERATION 405; COLLECT ELECTRONIC DATA INCLUDING DATA REPRESENTING HEALTH CARE EXPENSE TRANSACTIONS OPERATION 407; and IDENTIFY ELIGIBLE HEALTH CARE EXPENSE TRANSACTIONS/VERIFY THE ELIGIBLE HEALTH CARE EXPENSE TRANSACTIONS OPERATION 409 of FIG. 4 and process for health care expense verification and reimbursement processing 400.

In one embodiment, once the electronic data is analyzed to identify health care expense transactions that are potentially eligible for reimbursement and the identified health care expense transactions are verified at IDENTIFY ELIGIBLE HEALTH CARE EXPENSE TRANSACTIONS/VERIFY THE ELIGIBLE HEALTH CARE EXPENSE TRANSACTIONS OPERATION 309, process flow proceeds to PROVIDE EMPLOYEE WITH LISTING OF IDENTIFIED ELIGIBLE HEALTH CARE EXPENSE TRANSACTIONS FOR EMPLOYEE REVIEW/APPROVAL OPERATION 410.

In one embodiment, at PROVIDE EMPLOYEE WITH LISTING OF IDENTIFIED ELIGIBLE HEALTH CARE EXPENSE TRANSACTIONS FOR EMPLOYEE REVIEW/APPROVAL OPERATION 410 eligible health care expense transactions are also verified by the employee. In one embodiment, once eligible health care expense transactions are identified, the employee is presented with an eligible health care expense transactions report including a display and/or listing of the eligible health care expense transactions. In one embodiment, the employee is then provided the opportunity to edit the display/list and/or remove specific potentially eligible health care expense transactions from the listing and/or report prior to submission to the program administrator.

The verification process at PROVIDE EMPLOYEE WITH LISTING OF IDENTIFIED ELIGIBLE HEALTH CARE EXPENSE TRANSACTIONS FOR EMPLOYEE REVIEW/APPROVAL OPERATION 410 affords the employee the opportunity to remove otherwise eligible health care expense transactions items from the reimbursement process. This might be used by the employee in an effort to maintain a desired balance in the health care expense account or to maintain a certain level of privacy, or for any other reason the employee may have.

Once eligible health care expense transactions are verified by the employee at PROVIDE EMPLOYEE WITH LISTING OF IDENTIFIED ELIGIBLE HEALTH CARE EXPENSE TRANSACTIONS FOR EMPLOYEE REVIEW/APPROVAL OPERATION 410, process flow proceeds to TRANSFER IDENTIFIED AND/OR VERIFIED ELIGIBLE HEALTH CARE EXPENSE TRANSACTIONS TO HEALTH CARE EXPENSE ACCOUNT PROGRAM ADMINISTRATOR OPERATION 411. TRANSFER IDENTIFIED AND/OR VERIFIED ELIGIBLE HEALTH CARE EXPENSE TRANSACTIONS TO HEALTH CARE EXPENSE ACCOUNT PROGRAM ADMINISTRATOR OPERATION 411 and REIMBURSE EMPLOYEE FOR IDENTIFIED AND/OR VERIFIED ELIGIBLE HEALTH CARE EXPENSE TRANSACTIONS UP TO PROGRAM LIMITS OPERATION 413 are substantially identical to TRANSFER IDENTIFIED AND/OR VERIFIED ELIGIBLE HEALTH CARE EXPENSE TRANSACTION DATA TO HEALTH CARE EXPENSE ACCOUNT PROGRAM ADMINISTRATOR OPERATION 211 and REIMBURSE EMPLOYEE FOR IDENTIFIED AND/OR VERIFIED ELIGIBLE HEALTH CARE EXPENSE TRANSACTIONS UP TO PROGRAM LIMITS OPERATION 213 discussed above with respect to FIG. 2 and process for health care expense verification and reimbursement processing 200. Consequently, the discussion above with respect to TRANSFER IDENTIFIED AND/OR VERIFIED ELIGIBLE HEALTH CARE EXPENSE TRANSACTION DATA TO HEALTH CARE EXPENSE ACCOUNT PROGRAM ADMINISTRATOR OPERATION 211 and REIMBURSE EMPLOYEE FOR IDENTIFIED AND/OR VERIFIED ELIGIBLE HEALTH CARE EXPENSE TRANSACTIONS UP TO PROGRAM LIMITS OPERATION 213 is equally applicable to, and is incorporated here for, TRANSFER IDENTIFIED AND/OR VERIFIED ELIGIBLE HEALTH CARE EXPENSE TRANSACTIONS TO HEALTH CARE EXPENSE ACCOUNT PROGRAM ADMINISTRATOR OPERATION 411 and REIMBURSE EMPLOYEE FOR IDENTIFIED AND/OR VERIFIED ELIGIBLE HEALTH CARE EXPENSE TRANSACTIONS UP TO PROGRAM LIMITS OPERATION 413 of FIG. 4.

In one embodiment, once the employee/consumer is reimbursed, or scheduled to be reimbursed, at REIMBURSE EMPLOYEE FOR IDENTIFIED AND/OR VERIFIED ELIGIBLE HEALTH CARE EXPENSE TRANSACTIONS UP TO PROGRAM LIMITS OPERATION 413, process flow proceeds to EXIT OPERATION 420 and process for health care expense verification and reimbursement processing 400 returns to COLLECT ELECTRONIC DATA INCLUDING DATA REPRESENTING HEALTH CARE EXPENSE TRANSACTIONS OPERATION 407 to await the next cycle and/or transaction.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "providing", "collecting", "identifying", "transferring", "storing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for health care expense verification and reimbursement processing comprising:

collecting electronic data comprising health care expense transaction data originating from two or more different originators;

obtaining health care expense eligibility restrictions from a health care expense account program administrator and using the eligibility restrictions to analyze the electronic data to identify one or more health care expense transactions potentially eligible for reimbursement;

verifying at least one eligible health care expense transaction of the one or more potentially eligible health care expense transactions identified, a health expense transaction being considered verified and thus eligible for immediate payment if the health care expense transaction data for the particular transaction originates from a particular source, the particular source being a particular healthcare provider, or a particular health insurance provider, a health expense transaction requiring further verification processing if the health care expense transaction data for the particular transaction originates from a source other than the particular source;

providing a consumer of the health care expense account program with a list of at least one verified health care expense transaction from verifying at least one eligible health care expense transaction of the one or more potentially eligible health care expense transactions identified;

providing the consumer of the health care expense account program the opportunity to edit the list of the at least one verified health care expense transaction prior to transferring electronic data representing the at least one verified health care expense transaction to the health care expense account program administrator; and transferring electronic data representing at least one verified health care expense transaction to the health care expense account program administrator.

2. The computing system implemented process for health care expense verification and reimbursement processing of claim 1, wherein;
   the electronic data comprising health care expense transaction data is collected, at least in part, from explanation of benefits data provided by a health insurance provider.

3. The computing system implemented process for health care expense verification and reimbursement processing of claim 1, wherein;
   the electronic data comprising health care expense transaction data is collected, at least in part, from electronic invoice data provided by a health care provider.

4. The computing system implemented process for health care expense verification and reimbursement processing of claim 1, wherein;
   the electronic data comprising health care expense transaction data is collected, at least in part, from electronic transaction data provided by a financial institution.

5. The computing system implemented process for health care expense verification and reimbursement processing of claim 4, wherein;
   electronic transaction data provided by the financial institution comprises line item detail transaction data.

6. The computing system implemented process for health care expense verification and reimbursement processing of claim 4, wherein;
   the financial institution is a bank.

7. The computing system implemented process for health care expense verification and reimbursement processing of claim 4, wherein;
   the financial institution is a credit account provider.

8. The computing system implemented process for health care expense verification and reimbursement processing of claim 1, wherein;
   the electronic data comprising health care expense transaction data is collected, at least in part, from electronic receipt data provided by a provider of medical supplies.

9. The computing system implemented process for health care expense verification and reimbursement processing of claim 1, wherein;
   the health care expense account program is a flexible spending account (FSA) program.

10. The computing system implemented process for health care expense verification and reimbursement processing of claim 1, wherein;

the health care expense account program is a health care reimbursement arrangement (HRA) program.

11. The computing system implemented process for health care expense verification and reimbursement processing of claim 1, wherein;
the health care expense account program is a health care spending account (HSA) program.

12. The computing system implemented process for health care expense verification and reimbursement processing of claim 1, further comprising:
reimbursing a consumer of the health care expense account program for the at least one verified health care expense transaction from a health care expense account associated with the consumer.

13. A computer program product for providing a process for health care expense verification and reimbursement processing comprising:
a nontransitory computer readable medium;
and computer program code, encoded on the computer readable medium, comprising computer readable instructions which when executed by a processor perform a process for health care expense verification and reimbursement processing, the process comprising:
collecting electronic data comprising health care expense transaction data originating from two or more different originators;
obtaining health care expense eligibility restrictions from a health care expense account program administrator and using the eligibility restrictions to analyze the electronic data to identify one or more health care expense transactions potentially eligible for reimbursement;
verifying at least one eligible health care expense transaction of the one or more potentially eligible health care expense transactions identified, a health expense transaction being considered verified and thus eligible for immediate payment if the health care expense transaction data for the particular transaction originates from a particular source, the particular source being a particular healthcare provider, a particular health insurance provider, a health expense transaction requiring further verification processing if the health care expense transaction data for the particular transaction originates from a source other than the particular source;
providing a consumer of the health care expense account program with a list of at least one verified health care expense transaction from the verifying at least one eligible health care expense transaction of the one or more potentially eligible health care expense transactions identified;
providing the consumer of the health care expense account program the opportunity to edit the list of the at least one verified health care expense transaction prior to transferring electronic data representing the at least one verified health care expense transaction to the health care expense account program administrator; and
transferring electronic data representing at least one verified health care expense transaction to the health care expense account program administrator.

14. The computer program product for providing a process for health care expense verification and reimbursement processing of claim 13, wherein;
the electronic data comprising health care expense transaction data is collected, at least in part, from explanation of benefits data provided by a health insurance provider.

15. The computer program product for providing a process for health care expense verification and reimbursement processing of claim 13, wherein;
the electronic data comprising health care expense transaction data is collected, at least in part, from electronic invoice data provided by a health care provider.

16. The computer program product for providing a process for health care expense verification and reimbursement processing of claim 13, wherein;
the electronic data comprising health care expense transaction data is collected, at least in part, from electronic transaction data provided by a financial institution.

17. The computer program product for providing a process for health care expense verification and reimbursement processing of claim 16, wherein;
electronic transaction data provided by the financial institution comprises line item detail transaction data.

18. The computer program product for providing a process for health care expense verification and reimbursement processing of claim 16, wherein;
the financial institution is a bank.

19. The computer program product for providing a process for health care expense verification and reimbursement processing of claim 16, wherein;
the financial institution is a credit account provider.

20. The computer program product for providing a process for health care expense verification and reimbursement processing of claim 13, wherein;
the electronic data comprising health care expense transaction data is collected, at least in part, from electronic receipt data provided by a provider of medical supplies.

21. The computer program product for providing a process for health care expense verification and reimbursement processing of claim 13, wherein;
the health care expense account program is a flexible spending account (FSA) program.

22. The computer program product for providing a process for health care expense verification and reimbursement processing of claim 13, wherein;
the health care expense account program is a health care reimbursement arrangement (HRA) program.

23. The computer program product for providing a process for health care expense verification and reimbursement processing of claim 13, wherein;
the health care expense account program is a health care spending account (HSA) program.

24. The computer program product for providing a process for health care expense verification and reimbursement processing of claim 13, wherein;
the computer program code, encoded on the computer readable medium, further comprises computer readable instructions for:
reimbursing a consumer of the health care expense account program for the at least one verified health care expense transaction from a health care expense account associated with the consumer.

* * * * *